(12) United States Patent
Shim et al.

(10) Patent No.: US 6,640,113 B1
(45) Date of Patent: Oct. 28, 2003

(54) TOUCH SENSITIVE DISPLAY INTEGRATED WITH A HANDHELD RADIOTELEPHONE

(75) Inventors: Jae H. Shim, San Jose, CA (US); Ilwhan Park, Pleasanton, CA (US)

(73) Assignee: Mobigence, Inc., San Jose, CA (US)

( * ) Notice: Subject to any disclaimer, the term of this patent is extended or adjusted under 35 U.S.C. 154(b) by 350 days.

(21) Appl. No.: 09/657,951

(22) Filed: Sep. 8, 2000

(51) Int. Cl.[7] .................................................. H04B 1/38
(52) U.S. Cl. ........................................ 455/566; 455/556
(58) Field of Search ................................ 455/556, 566, 455/575; 345/903, 905, 1.1, 2.3, 173, 156

(56) References Cited

U.S. PATENT DOCUMENTS

| | | | | |
|---|---|---|---|---|
| 5,561,446 A | * | 10/1996 | Montlick .................... | 345/173 |
| 5,893,037 A | * | 4/1999 | Reele et al. ................ | 455/556 |
| 5,907,289 A | * | 5/1999 | Kondo ....................... | 340/7.51 |
| 6,085,112 A | * | 7/2000 | Kleinschmidt et al. ...... | 455/556 |
| 6,112,099 A | * | 8/2000 | Ketola ........................ | 455/466 |
| 6,208,879 B1 | * | 3/2001 | Iwata et al. ................. | 455/566 |
| 6,317,593 B1 | * | 11/2001 | Vossler ....................... | 455/414 |
| 6,327,482 B1 | * | 12/2001 | Miyashita ................... | 455/566 |
| 6,349,040 B2 | * | 2/2002 | Lefort ......................... | 361/814 |
| 6,445,932 B1 | * | 9/2002 | Soini et al. ................. | 455/556 |
| 2002/0082043 A1 | * | 6/2002 | Wilska et al. ............... | 455/550 |

* cited by examiner

*Primary Examiner*—Nay Maung
*Assistant Examiner*—Tan Trinh
(74) *Attorney, Agent, or Firm*—John F. Schipper

(57) ABSTRACT

An integrated system including radiotelephone and a touch sensitive display, electronically communicating with the radiotelephone, that can be stored within a slot provided in radiotelephone housing. The display is removed from the slot for use and communicates with the radiotelephone through a cable or through a wireless connection. The display may be arranged with a selected orientation relative to the radiotelephone so that the display and the radiotelephone are supported in the same plane.

18 Claims, 5 Drawing Sheets

TOUCH SENSITIVE DISPLAY INTEGRATED WITH A HANDHELD RADIOTELEPHONE

FIELD OF THE INVENTION

This invention relates to the manner in which a handheld radiotelephone is integrated with a touch sensitive pad and with a touch sensitive screen for entering and displaying information.

BACKGROUND OF THE INVENTION

Conventional portable, handheld radiotelephones ("radiotelephones") are provided with a liquid crystal display or other display (collectively referred to as "LCD"), whose size (usually two to four lines) is designed to be suitable for only telephone related functions, such as displaying a reference number optionally with its associated information, for example, a name and other relevant information.

With the convergence of wireless and information technologies, a radiotelephone serves, not only as a voice communication device, but also for information access, with text and graphics applications ranging from composing e-mail messages, editing a personal calendar, drafting memos, and editing an address book, to surfing the Internet. This kind of hybrid radiotelephone, sometimes referred to as a Smart-phone, a Web-phone or some other similar name (collectively referred to as a "Smart-phone" herein) is equipped with a larger graphics LCD to display these text intensive and graphics applications in a more optimal way. To address the need for entering and editing alphanumeric and other characters in a more effective manner than by using the keypad, the LCD of Smart-phones is also overlaid with a touch sensitive screen so that an embedded keyboard or character recognition software can be used as a better alternative for entering and editing alphanumeric and other characters.

However, this approach is not optimized, because embedding the soft keyboard in the LCD reduces the overall useful area of the LCD proportionally for actual information display. Further, this approach is not optimized for recognition of cursive writing, because the area allocated in the touch sensitive screen is limited to a relatively small area for single character recognition.

Vendors of certain Smart-phones have attempted to address this issue by substantially increasing the LCD size. This alternative approach increases the overall size of the radiotelephone housing so that the radiotelephone can no longer be characterized as a hand held device. What is needed is a radiotelephone with an additional, large, touch sensitive display that does not substantially increase the size of the housing.

SUMMARY OF THE INVENTION

These needs are met by the invention, which provides a unique approach to provide an additional touch pad and/or touch sensitive screen (referred to collectively herein as "touch sensitive display") and to integrate this device with a radiotelephone. This approach provides an additional character entry device and an additional text and/or graphics display device, without substantially increasing the overall size of the radiotelephone housing.

The touch sensitive display, when not in use, is received and securely stored within the radiotelephone and is easily withdrawn from the radiotelephone housing for use. The touch sensitive display is received into the radiotelephone housing through a slot or aperture in a selected surface (top or bottom or, preferably, side) of the housing and may be locked in place or otherwise firmly held relative to the radiotelephone. The touch sensitive display is electronically connected to, and may be spaced apart from, the remainder of the radiotelephone by a cable or by use of short range electromagnetic signals, such as infrared signals and other wireless formats.

DESCRIPTION OF BEST MODES OF THE INVENTION

Figure 1A:
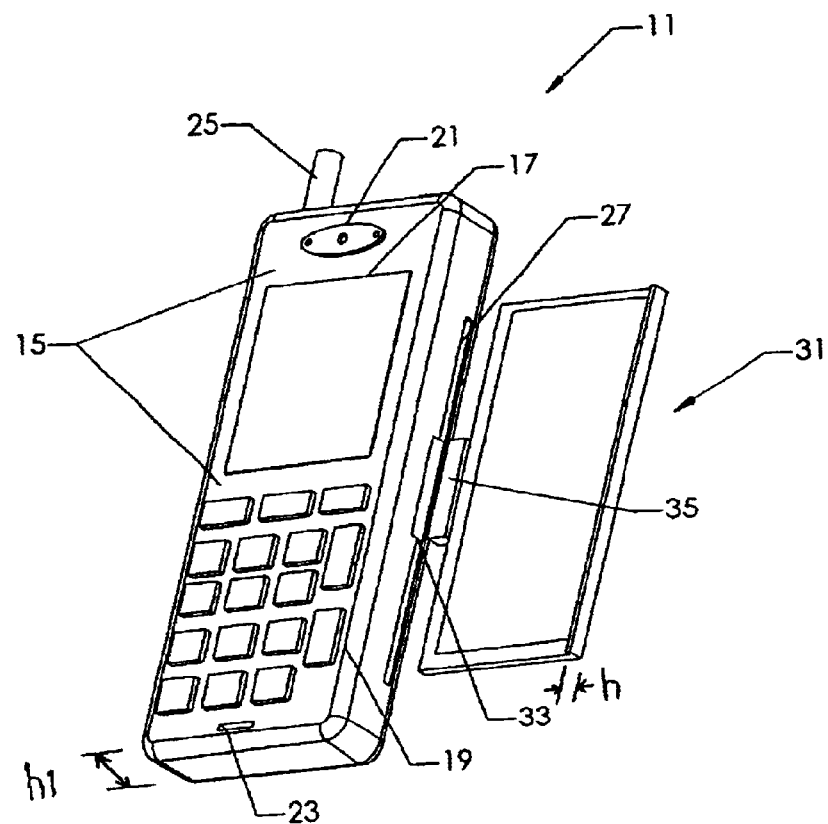
FIG. 1A is a perspective view illustrating a touch sensitive display removed from but connected to the radiotelephone housing in one embodiment of the invention.

FIG. 1A illustrates a first embodiment of the invention, wherein a radiotelephone 11 is integrated with a touch sensitive display 31. The radiotelephone 11 includes a housing 15, a display screen 17, a keypad 19, a speaker 21, a microphone 23, a radiotelephone antenna 25 and a slot 27 in a selected side, top or bottom surface of the housing 15 that receives and stores the touch sensitive display 31 when the touch sensitive display is not in use. The touch sensitive display 31 has a thickness h that is preferably no more than about 1.5 cm, if a liquid crystal display with touch sensitive screen is provided, and no more than 1.5–5 mm otherwise.

The touch sensitive display 31 has a release button or knob 33, located above or below the slot 27, is used to release the display from its confinement within the slot, and to secure the display within the slot when the display is stored. The touch sensitive display 31 has a flexible cable or other electrical connection 35 that connects the display to one or more electronic components and to an electrical power source located in or on the radiotelephone.

Figure 1B:
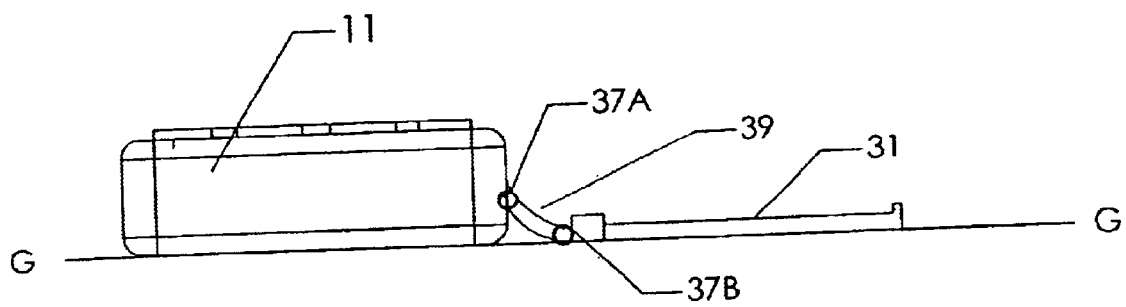
FIG. 1B is a side view illustrating one method of hinging the touch sensitive display in one embodiment.

The length of the flexible cable 35 allows the touch sensitive display 31 to be fully extended out of its slot 27 and, optionally, to be angularly oriented (or rotated) relative to the radiotelephone, as illustrated in FIG. 1B, so that a plane of the touch sensitive display is approximately parallel with a display support surface, such as the ground or a table or desk. Preferably, the touch sensitive display 31 is mechanically connected to some part of the radiotelephone 11 by first and second rotatable hinges, 37A and 37B, arranged serially and connected by a straight or curved connecting segment 39 of solid material that allows the second hinge to rotate relative to the first hinge. This arrangement allows the user to optionally position the touch sensitive display 31 so that the display and the radiotelephone are each supported by a local support surface GG, such as a table or the ground. The connecting segment 39 may be rigid or may be flexible and/or bendable.

Figure 2:
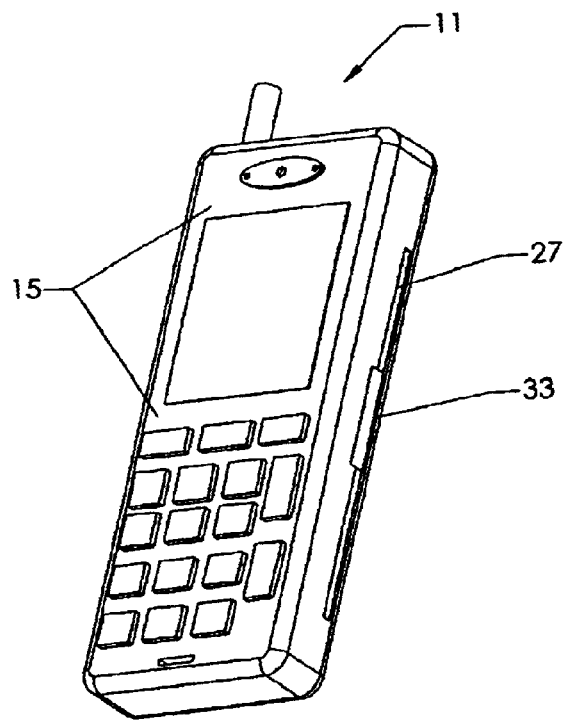
FIG. 2 is a perspective view of the embodiment of FIG. 1, with the touch sensitive display received into the housing.

FIG. 2 is a perspective view of the radiotelephone 11, with the touch sensitive display (not shown) withdrawn into the slot 27 and secured with the release knob 33. The thickness h of the display and of its associated slot 27 may add a small amount, preferably no more than 1.5 mm to 1.5 cm, to the thickness h1 of the radiotelephone 11 and of its housing 15. Where the radiotelephone 11 is integrated with the touch sensitive display 31, the length of the integrated device may be unchanged from the length of a conventional radiotelephone, as long as the length of the touch sensitive is at least 1–2 cm less than the length of the telephone housing 15; and the width of the integrated device may be unchanged from the width of a conventional radiotelephone, if the width of the touch sensitive display is no greater than the maximum width of the LCD viewing area.

Figure 3A:
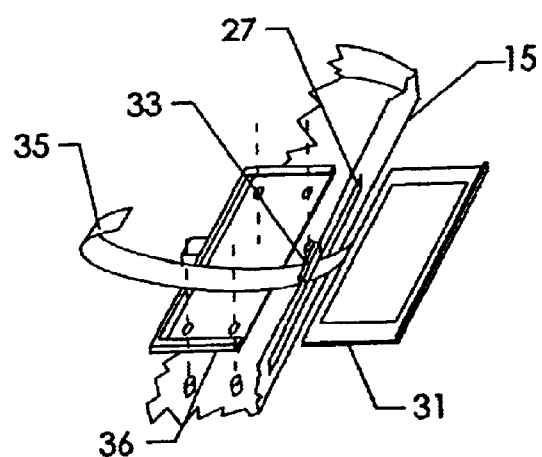
FIGS. 3A, 3B and 3C are perspective views illustrated use of a touch sensitive display with a guide frame that is optionally part of the housing.

FIG. 3A illustrates the touch sensitive display 31, the cable 35 and a guide frame 36, where the display is withdrawn from the slot 27. The guide frame 36 provides a movement path for the display 31 when the display moves out of, or returns to, the slot 27 provided in the radiotelephone housing 15.

Figure 3B:
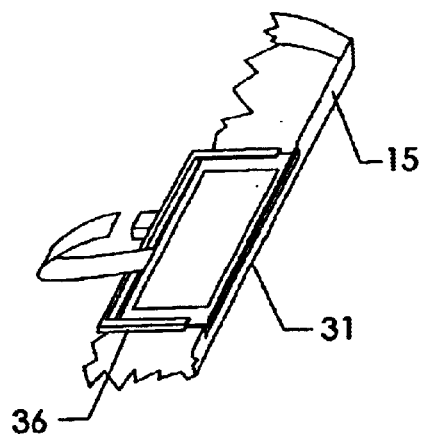

The guide frame 36 is configured to prevent the touch sensitive display 31 from being tilted or misaligned within the radiotelephone housing 15 and the slot (27 in FIG. 3A), as illustrated in FIG. 3B, so that the display can be easily moved out of, or moved into, the slot provided in the radiotelephone housing.

Figure 3C:
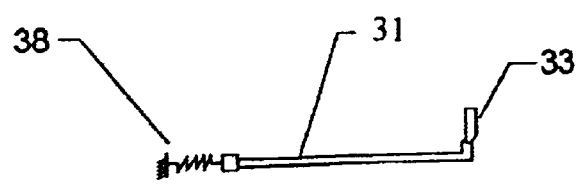
Figure 4:
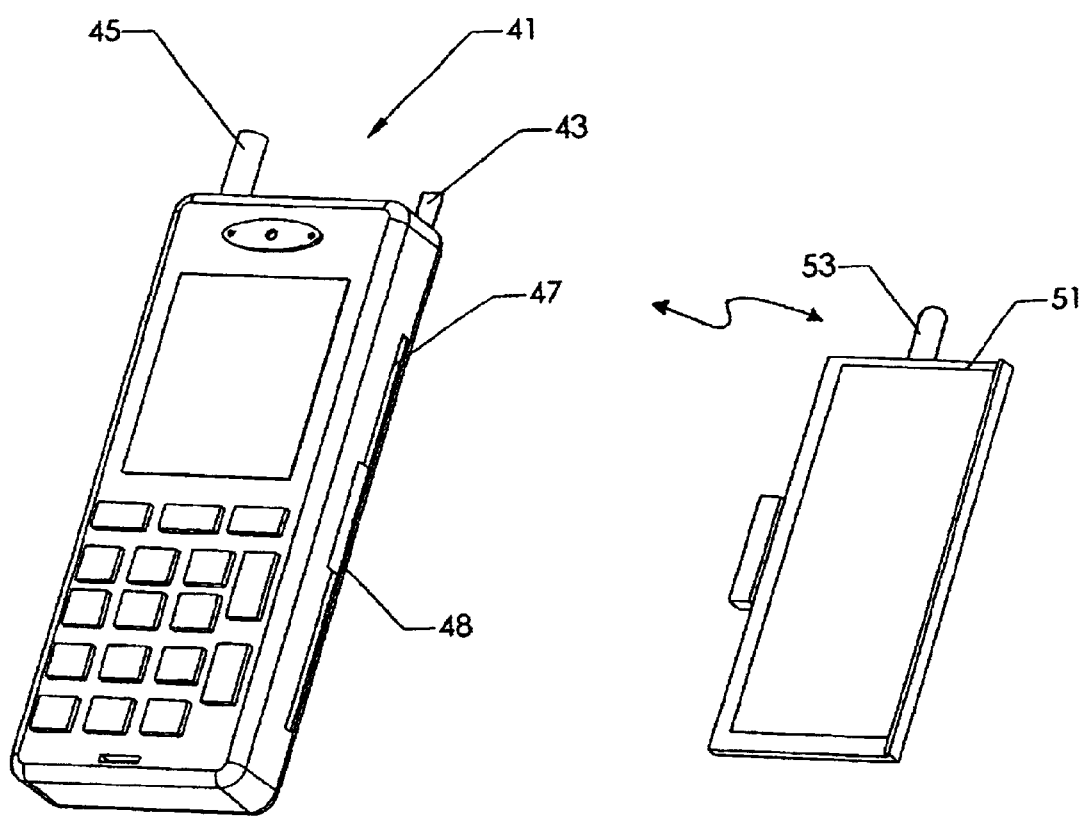
FIG. 4 is a perspective view illustrating a second embodiment of the invention, with the touch sensitive display removed and spaced apart from the housing.

FIG. 3C is a side view illustrating a spring lock and release toggle mechanism 38 for the touch sensitive display 31 that allows the display to move out from, and to be received in and secured within, the slot (27 in FIG. 3A). The touch sensitive display 31 is released from within the slot by depressing the release knob 33 or by another action that causes the spring and associated toggle mechanism 38 to release the display and to allow the display to slide or otherwise move along the guide frame (36 in FIG. 3A).

In a second embodiment of the invention, a radiotelephone 41 includes conventional radiotelephone components (speaker, microphone, keypad, display screen, antenna, etc.) plus a slot 47 and release button 48 to receive and securely store a touch sensitive display 51. The touch sensitive display 51 has an antenna 53 that communicates with an auxiliary antenna 43 on the radiotelephone 41. Optionally, the antenna 43 coincides with the conventional radiotelephone antenna 45. When the touch sensitive display 51 is removed from the slot 47, the display communicates with the radiotelephone 41 using electromagnetic waves, including but not limited to an appropriate frequency for wireless communication (e.g., 1 GHz–100 THz, covering infrared and Bluetooth), that are exchanged between the display antenna 53 and the auxiliary antenna 43 on the radiotelephone 41. Using infrared signals, the antennas 43 and 53 can communicate over distances up to 15 feet, although antenna-antenna separation distances of no more than six feet are preferred for better signal definition. No cable, wire or other landline is required to connect the radiotelephone 41 and the touch sensitive display 51, but the display will require its own power source. As characters and/or figures are entered onto the touch sensitive display 51, signals representing these entries are formed and transmitted from the display to the radiotelephone 41, are received and further processed by a control processor connected to the antenna 43 in the radiotelephone, and are optionally stored in a memory unit associated with the control processor. The remainder of the radiotelephone 41 need not be activated when the touch sensitive display 51, antenna(s), 43 and 53, and control processor are being used.

Figure 5:
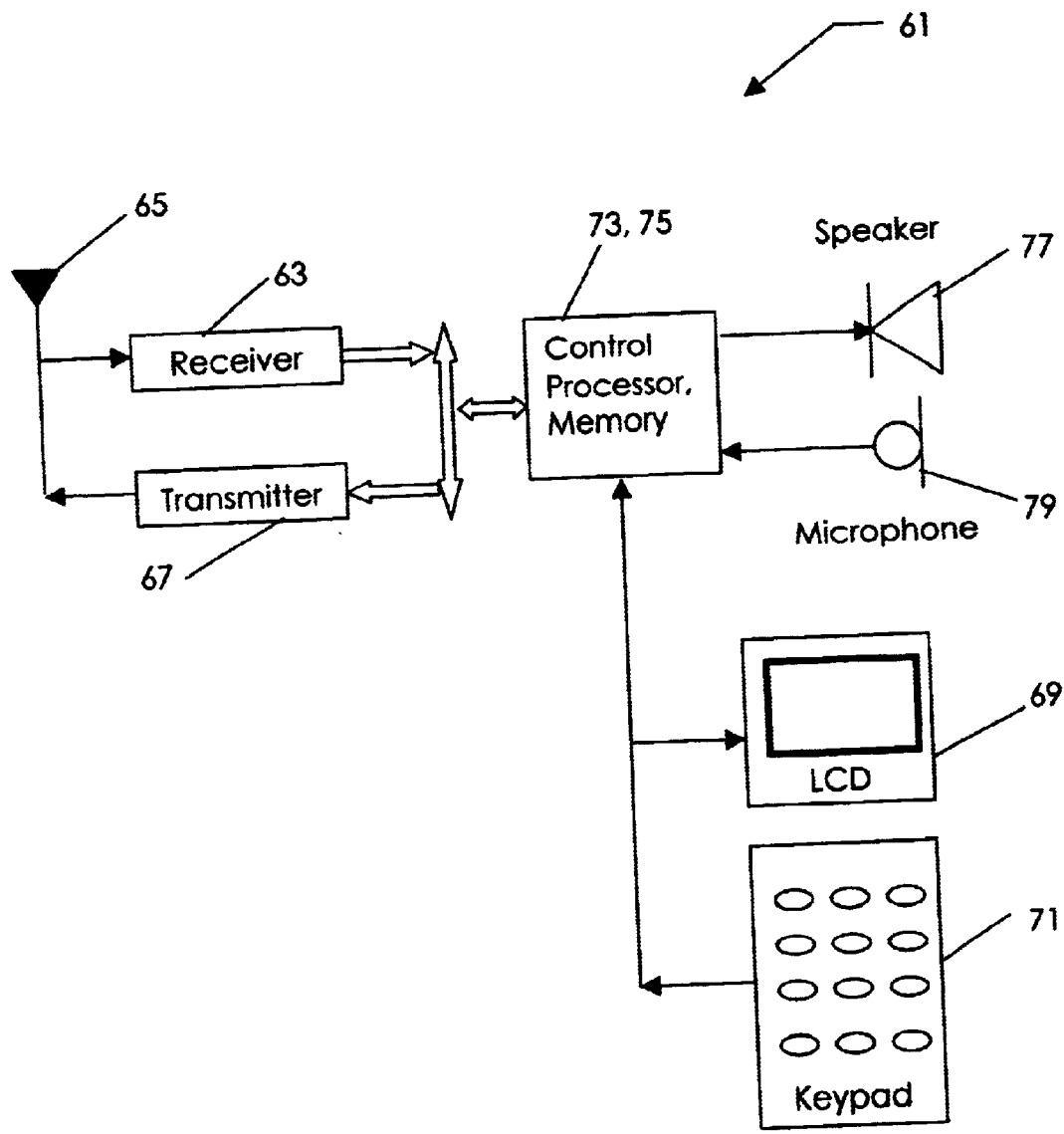
FIG. 5 is a schematic view illustrating a conventional radiotelephone system.

FIG. 5 is a schematic view of a conventional radiotelephone 61 powered by a battery or other power source. The radiotelephone 61 includes a signal receiver 63, connected to an antenna 65, to receive signals from an audio signal source and/or a data signal source, spaced apart from the radiotelephone. The radiotelephone 61 also includes a signal transmitter 67, also connected to the antenna 65, to transmit audio and/or data signals to an intended recipient. The radiotelephone 61 includes a display sub-system including a display screen 69 (e.g., an LCD), to display alphanumeric and other characters, and a keypad 71 with alphanumeric character entry keys. The radiotelephone 61 includes a control processor 73, optionally including a memory unit 75, to control the processing of audio and/or data signals received from, or to be sent to, the antenna. The radiotelephone 61 includes a speaker 77 and a microphone 79 whose signals are also processed by the control processor. A portable, handheld radiotelephone 61 also includes a battery or other source of electrical power for one or more of the other components.

What is claimed is:

1. An integrated radiotelephone system comprising:
 a radiotelephone, including a radiotelephone housing, a display screen, a keypad, a speaker, a microphone and an antenna, where the housing has a top surface, having at least one of the keypad and the display screen, a bottom surface spaced apart from the top surface, and at least one side surface positioned between the top surface and the bottom surface;
 a touch pad or touch sensitive screen, collectively referred to as a "touch sensitive display," for receiving information provided on at least one of the antenna and the touch sensitive display;
 a communication mechanism allowing exchange of information between the touch sensitive display and the radiotelephone;
 the at least one side surface of the radiotelephone housing having a slot therein for receiving and storing the touch sensitive display within the slot and within the housing and for allowing the touch sensitive display to be removed from the slot.

2. The system of claim 1, further comprising a lock and release mechanism, located within said slot and connected to said touch sensitive display, that receives and securely stores said touch sensitive display within said slot in and that releases said touch sensitive display and allows said touch sensitive display to be moved out of said slot.

3. The system of claim 2, further comprising an alignment mechanism, associated with said touch sensitive display, that allows said touch sensitive display to be oriented in at least one selected angular orientation relative to said radiotelephone.

4. The system of claim 3, wherein said alignment mechanism comprises at least one rotatable hinge connecting said touch sensitive display to said radiotelephone.

5. The system of claim 3, wherein said alignment mechanism comprises a first rotatable hinge connected to said radiotelephone, a second rotatable binge connected to said touch sensitive display, and a connecting segment that connects the first hinge and the second hinge.

6. The system of claim 1, wherein said communication mechanism comprises a cable connecting said touch sensitive display to said radiotelephone.

7. The system of claim 1, wherein said communication mechanism comprises:
 an auxiliary antenna, connected to said radiotelephone, for receiving signals from and transmitting signals to said touch sensitive display; and a touch sensitive display transceiver and touch sensitive display antenna for receiving said information provided on said touch sensitive display, for transmitting said provided information to the auxiliary antenna, and for receiving information from the auxiliary antenna, using electromagnetic signals in a selected frequency range.

8. The system of claim 7, wherein said selected frequency range includes at least one frequency in at least one of an infrared signal range and a Bluetooth signal range.

9. The system of claim 1, wherein said radiotelephone further comprises a signal processing module with recognition software for at least one of handwriting and character that receives and processes at least one character provided on said touch sensitive display and estimates one or more reference characters that are closest to one or more characters associated with the information entered on said touch sensitive display.

10. A method of communicating with a radiotelephone, the method comprising:

providing a touch pad or touch-sensitive screen, collectively referred to as a "touch sensitive display," for receiving information provided on at least,one of the antenna and the touch sensitive display;

providing a radiotelephone, including a radiotelephone housing, a display screen, a keypad, a speaker, a microphone and an antenna, wherein at least one surface of the housing has a slot therein for receiving and storing the touch sensitive display within the slot and within the housing and for allowing the touch sensitive display to be removed from the slot, where the housing has a top surface, having at least one of the keypad and the display screen, a bottom surface spaced apart from the top surface, and at least one side surface positioned between the top surface and the bottom surface; and providing a communication mechanism allowing exchange of information between the touch sensitive display and the radiotelephone.

11. The method of claim 10, further comprising providing a lock and release mechanism, located within said slot and connected to said touch sensitive display, that receives and securely stores said touch sensitive display within said slot in and that releases said touch sensitive display and allows said touch sensitive display to be moved out of said slot.

12. The method of claim 11, further comprising providing an alignment mechanism, associated with said touch sensitive display, that allows said touch sensitive display to be oriented in at least one selected angular orientation relative to said radiotelephone.

13. The method of claim 12, further comprising choosing said alignment mechanism to comprise at least one rotatable hinge connecting said touch sensitive display to said radiotelephone.

14. The method of claim 12, further comprising choosing said alignment mechanism to comprise a first rotatable hinge connected to said radiotelephone, a second rotatable hinge connected to said touch sensitive display, and a connecting segment that connects the first hinge and the second hinge.

15. The method of claim 10, further comprising choosing said communication mechanism to comprise a cable connecting said touch sensitive display to said radiotelephone.

16. The method of claim 10, further comprising choosing said communication means to comprise:

an auxiliary antenna, connected to said radiotelephone, for receiving signals from and transmitting signals to said touch sensitive display; and a touch sensitive display transceiver and touch sensitive display antenna for receiving said information provided on said touch sensitive display, for transmitting said provided information to the auxiliary antenna, and for receiving information from the auxiliary antenna, using electromagnetic signals in a selected frequency range.

17. The method of claim 16, further comprising choosing said selected frequency range to include at least one frequency in at least one of an infrared signal range and a Bluetooth signal range.

18. The method of claim 10, further comprising providing said radiotelephone with a signal processing module recognition software for at least one of handwriting and character that receives and processes at least one character provided on said touch sensitive display and estimates one or more reference characters that are closest to one or more characters associated with the information entered on said touch sensitive display.

* * * * *